United States Patent [19]

Mita

[11] 4,011,572
[45] Mar. 8, 1977

[54] SHUTTER RELEASE MECHANISM FOR CAMERAS WITH AN ELECTRIC SHUTTER
[75] Inventor: Kunio Mita, Wako, Japan
[73] Assignee: Asahi Kogaku Kogyo Kabushiki Kaisha, Tokyo, Japan
[22] Filed: Apr. 9, 1975
[21] Appl. No.: 566,476
[30] Foreign Application Priority Data
Apr. 10, 1974 Japan .............................. 49-41527
[52] U.S. Cl. .......................... 354/266; 354/60 R; 354/258
[51] Int. Cl.² ........................................ G03B 17/38
[58] Field of Search .................... 354/24, 48–51, 354/266–268, 258, 60 R
[56] References Cited
UNITED STATES PATENTS

| 3,481,262 | 12/1969 | Suzuki et al. | 354/266 |
| 3,623,410 | 11/1971 | Mita | 354/51 |
| 3,628,433 | 12/1971 | Takayama et al. | 354/258 |
| 3,657,986 | 4/1972 | Kitai | 354/258 |
| 3,812,511 | 5/1974 | Hackenberg et al. | 354/258 |
| 3,950,774 | 4/1976 | Mita et al. | 354/266 |

Primary Examiner—L. T. Hix
Assistant Examiner—J. A. La Barre
Attorney, Agent, or Firm—Sughrue, Rothwell, Mion, Zinn & Macpeak

[57] ABSTRACT

A release member and a latching member are pivotably mounted in juxtaposition to a pivotable shutter operating member. The release member and the latching member are spring biased to latch the shutter operating member to shutter non-operating position and the release member to a position where it maintains the power switch contacts open for controlling the power drive of the shutter. Limited play between the release member and the latching member permits the switch contacts to close prior to the latching member releasing the shutter operating member and the shutter operating member in turn, when moved to shutter operating position, maintains the release member in release position to maintain the power switch contacts closed.

4 Claims, 6 Drawing Figures

SHUTTER RELEASE MECHANISM FOR CAMERAS WITH AN ELECTRIC SHUTTER

BACKGROUND OF THE INVENTION

1 Field of the Invention

This invention relates to a shutter release mechanism for cameras employing an electrically controlled shutter, and more particularly to a release mechanism that insures shutter release only after the electric circuit becomes stable and insures opening of the power switch contacts if shutter release operation ceases prior to the shutter itself starting to move.

2. Description of the Prior Art

In cameras employing an electric shutter, it is desirable to prevent the waste of electrical power as much as possible. Therefore, the time during which the power switch is closed and the shutter maintained open under control of the electrical circuit should preferably be as short as possible when taking a picture.

Shutter release mechanisms employed in such cameras allow this power switch to be closed and the shutter operating member to be actuated, that is, shifted from shutter non-operating or latching position to shutter operating or release position upon movement of a latching member which is manually shifted by depression of a shutter button.

Although the switch closing time is preferably short, it is desirable that the switch contacts close in the early stage of the shutter release operation so that the shutter itself is released only after the electric circuit becomes stable which occurs shortly after connection of the power source to the circuit components. Further, it is desired that the closed switch should open without fail even when the shutter release is stopped after initiation during the initial stage of release operation if shutter release ceases prior to the shutter itself starting to move. Further, once the shutter itself has started to move from closed to open position, it is desired that the power switch be maintained closed until shutter release is completed.

The present invention satisfies the above requirements by way of a simple and effective construction which insures positive operation at each time of depression of the shutter button.

In accordance with the present invention, the power switch is immediately closed upon the depression of the shutter button, and the shutter operating member is actuated by continued movement of the release member by contact of the shutter button with a time delay between closure of the power switch contacts and positive movement of an associated latching member to unlatch the shutter operating member. Further, in accordance with the present invention, the release member is held in the shutter release position by movement of the shutter operating member to shutter operating position to maintain the switch contacts closed until the shutter release operation is completed.

Specifically, the release mechanism of the present invention includes a pivotable shutter operating member movable between shutter latching position and shutter release position. First means spring biases the shutter operating member towards the shutter release position. A latching member in juxtaposition to said shutter operating member and pivotable between latch and unlatch positions has an end portion engageable with said a shutter operating member to maintain said shutter operating member in shutter latching position against the biasing force of said spring means. Second spring biasing means, spring biases the latching member towards latching position. A release member is pivotably mounted common with said latching member, is spring biased towards engagement with said latching member, and is operatively positioned with respect to a power supply switch for supplying power to the electrical circuit and controlling the electric shutter so as to normally maintain said switch contacts thereof in open position. The release member is pivotably mounted relative to the shutter latching member in a manner to permit limited movement of the release member relative to the latching member to allow the release member to close the switch contacts prior to driving the latching member against the second spring biasing means. Movement of a push button or a push button interlocking member causes the latching member to rotate about the common pivot axis, disengaging the latching member from the shutter operating member and permitting the shutter operating member to pivot under the bias of the first biasing means from shutter latching position to shutter release position. Means responsive to movement of the latching member to unlatch position and constituting engagement of the shutter operating member with another portion of the latching member positively maintains the release member in release position to insure continued closure of the power switch contacts.

DESCRIPTION OF THE PREFERRED EMBODIMENTS

With reference to all three embodiments, like elements are given like numerical designation, and only those elements of the camera pertinent to the shutter release mechanism of the present invention are shown in each of the illustrated embodiments to simplify the description.

With respect to each of the embodiments, the drawings illustrate the condition of the mechanism or state prior to release of the shutter and subsequent to the release of the shutter, keeping in mind that the shutter mechanism returns to the cocked or latched state after the shutter operation has been completed, and where, in each instance, the shutter operating member is shifted against the biasing force of its biasing spring upon wind up of the film for preparation of taking a picture. In this respect, reference to FIG. 1 shows a shutter operating member 1 pivotably mounted by means of pivot pin 6 so that it rotates in the direction of the arrow C under the bias of a coil spring 16. That is, when the shutter operating member rotates in a clockwise direction, the shutter operating member operates a shutter (not shown) as result of such rotation, that is, it shifts the shutter momentarily to expose the film whose exposure is timed by way of an electrical circuit (not shown) which includes power switch 4. The nature of the shutter operation, and control of that shutter through power switch 4 is conventional, and does not form a part of the present invention.

Figure 1A:
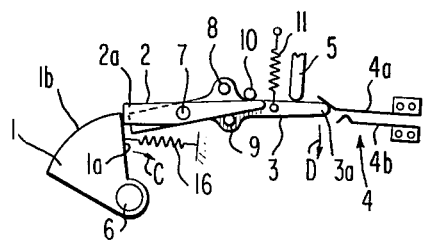
FIG. 1a is a schematic elevational view of one embodiment of the release mechanism of the present invention for a camera employing an electrically operated shutter, with the shutter operating member in latched, non-shutter operating position.

As mentioned previously, the shutter operating member 1 is shifted against the bias of spring 16 to the latched position shown in FIG. 1a upon the wind up of the film of the camera, of which this mechanism forms a portion thereof, and the shutter operating member 1 is latched in the position shown by means of latching member 2 whose tip end 2a engages a radial edge 1a of the sector shaped operating member 1. In this respect, a pin 7 commonly supports for pivoting, about its axis, latching member 2 and release member 3, both members being in the form of metal strips. The release member is provided with a pair of pins 8 and 9 acting as stops to limit the pivotable movement of the release member 3 relative to the latching member 2. In turn, a third pin 10 fixed to the camera casing acts as a fixed stop for the release member 3 which is biased by way of tension spring 11 for movement in a counterclockwise direction about the axis of pivot pin 7. Spring 11 also biases the latching member 2 counterclockwise and in a position such that the end 2a of the latching member engages the radial edge 1a of the shutter operating member 1. The tip end 3a of the shutter release member 3 engages the upper contact 4a of the power switch 4 fixedly mounted adjacent thereto and, in the shutter operating member latched position of FIG. 1a, the end 3a of the release member maintains the upper switch contact 4a spaced from the lower switch contact 4b and the switch therefore in open condition. A shutter release button or button interlocking member 5 is schematically illustrated as being mounted above the release member 3, that is, to the same side as the biasing spring 11 (within the camera casing, by means not shown) for axial movement and permitting the release button or interlocking member to press against the release member 3 so as to drive the release member and the latching member clockwise about the axis of pivot pin 7 and against the bias of spring 11 by depression of the same. As evidenced in contrasting conditions of FIGS. 1a and 1b, the release member 3 rotates in FIG. 1a clockwise as shown by arrow D overcoming the force of the biasing spring 11.

The initial clockwise rotation of the release member 3 causes the upper switch contact 4a to close upon lower contact 4b and the power switch 4 supplies appropriately electrical power from a source (not shown) to the electronic circuit (not shown) controlling the timing of the shutter (not shown). During this movement, the lower pin 9 moves away from the latching member 2 but the frictional engagement between the edge 1a of the shutter operating member and the end 2a of the latching member prevents the latching member for following the initial movement of the release member 3 as it rotates clockwise. However, when the upper pin 8 engages the upper edge of the latching member, it causes a clockwise rotation of the latching member 2 about the common pivot axis of pin 7, to move the end 2a of that latching member out of engagement with the edge 1a of the shutter operating member. It is only this extent of limited movement that is permitted between the release member 3 and the latching member 2 prior to effecting unlatching of the shutter operating member 1.

Figure 1B:
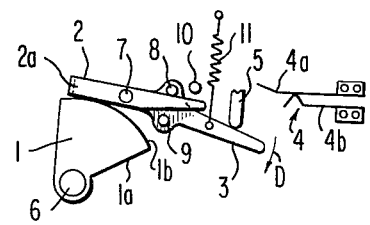
FIG. 1b is a similar view of the mechanism of FIG. 1a subsequent to shutter release.

When the end 2a of the latching member moves beyond the edge 1a of the shutter operating member, the shutter operating member 1 is free to pivot clockwise under the bias of spring 16, this causing the shutter to operate. The shutter operating member 1 moves to a position such that its peripheral edge 1b underlies the left hand end 2a of the latching member 2 and the corresponding end of the release member 3 as shown in FIG. 1b. With the members in this position, the release member 3 is prevented from contacting the power switch contact 4a to open the power switch 4. Thus until the shutter operating member is rotated against the bias of spring 16 to relatch position, the improved release mechanism of the present invention maintains the power switch in closed position until shutter operation is completed by operating of the shutter mechanism including an automatic diaphragm of the single lens reflex camera and mirrors as an example (not shown).

In the process of operation, if the shutter release button 5 is not completely depressed and if depressed even to the point where the power switch contacts 4a and 4b close, the subsequent release of the shutter release button causes the shutter button to move back to the position shown in FIG. 1a under the bias of spring 11, as long as the latching member 2 maintains the shutter operating member 1 in latched position. However, upon unlatching of the shutter operating member 1, this is impossible as seen by reference to FIG. 1b, in which case the left hand ends of the shutter latching member 2 and the shutter release member 3 are riding on the peripheral edge 1b of the shutter operating member.

As described, the present invention is characterized in that the power switch is effectively used in a simple manner by use of a shutter operating member acting in combination with a latching member and a release member, and the construction of which is not limited to the embodiment shown in the drawings. However, two alternate embodiments are illustrated.

Figure 2A:
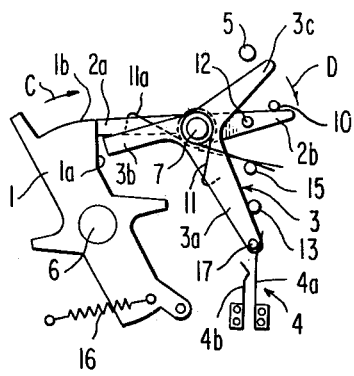
FIG. 2a is a elevational view of a second embodiment of the shutter release mechanism of the present invention with the shutter operating member in latched position.
Figure 2B:
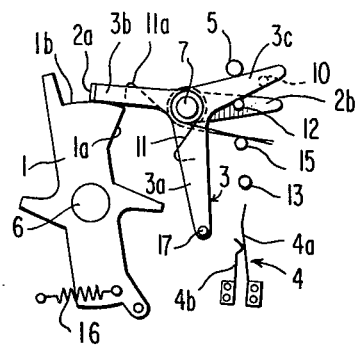
FIG. 2b is a similar view to that of FIG. 2a showing the elements in position at the time of shutter release after shutter release subsequent to shutter release.

Reference to FIGS. 2a and 2b show a second enbodiment of the invention where again, like elements are given like numerical designations. In this case, the shutter operating member 1 is not sector shaped in form but constitutes a member which is generally of irregular rectangular plan configuration and pivotably mounted intermediate of its ends by way of pivot pin 6.

Biasing spring 16 biases the shutter operating member in a clockwise direction, as evidenced by arrow C. The shutter latching member 2 is of somewhat similar configuration to that shown in the first embodiment and is pivotably mounted upon pin 7 for limited movement about the axis of the pin, pin 7 also acting as a common pivot axis and mount for the release member 3 which is of modified Y-shape comprised of three arms, 3a, 3b, and 3c. Arm 3a carries pin 17 which engages switch contact 4a. Arm 3b is directed toward shutter operating member edge 1a. Arm 3c underlies release button or interlocking member 5. First and second spring members 11 and 11a bias the T-shaped release member 3 and latching member 2, respectively, counterclockwise such that arm 3a of release member 3 is maintained against stop 13 constituted by a fixed pin. When in this position, pin 17 carried by that arm contacts the power switch contact 4a maintaining it open with respect to the shorter contact 4b. Pivot pin 7 commonly mounts the latching member 2 and the second spring 11a, which is also wrapped about the pin 7, biases the latching member 2 counterclockwise and right hand end 2b of the latching member in engagement with a fixed stop or pin 10. A pin 15 acts as a fixed stop for one end of each of the springs 11 and 11a, the other ends thereof being bent over the edges of respective members 2 and 3.

The operation of this embodiment of the invention may be seen by contrasting FIG. 2a to FIG. 2b. The depression of the release button or interlocking member 5 causes, initially, the release member 3 to rotate clockwise against the biasing force of spring 11, as shown by arrow D, and the stop 10 maintains the latching member in latching position with respect to the shutter operating member 1. When the edge of arm 3c which is opposite that facing the release button 5, engages a fixed pin 12 which is mounted to the latching member 2, this causes the latching member to rotate clockwise, against the bias of spring 11a, causing the end 2a of the latching member to move radially beyond the edge 1a of the shutter operating member releasing the shutter operating member and permitting it to rotate clockwise, as shown by arrow C, under the bias of spring 16. However, the initial rotation of the release member 3 effects only closure of switch contacts 4a and 4b, permitting power supply to the electronic circuit prior to release of the shutter operating member 1. In similar fashion to the prior embodiment of FIGS. 1a and 1b, arm 3b of the release member rides on an arcuate or peripheral edge 1b of the shutter operating member and end 2a latching member to ride thereon. The effect of this is to prevent arm 3c of the release member to again open the contacts of the power switch prior to completion of shutter operation.

The shutter operating member is relatched by a restoring operation which rotates that member in a counterclockwise direction against the bias of spring 16 effecting shifting of the elements back to the position shown in FIG. 2a and permitting another picture to be taken subsequently by similar operation.

Figure 3A:
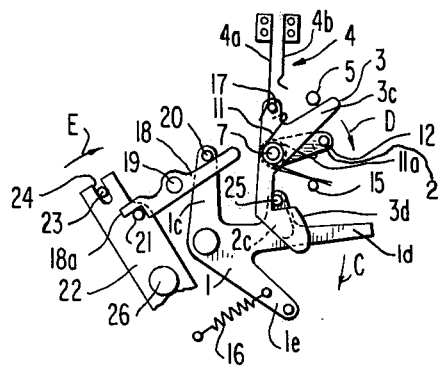
FIG. 3a is an elevational view of a third embodiment of the release mechanism of the present invention with the shutter operating member in latched position.
Figure 3B:
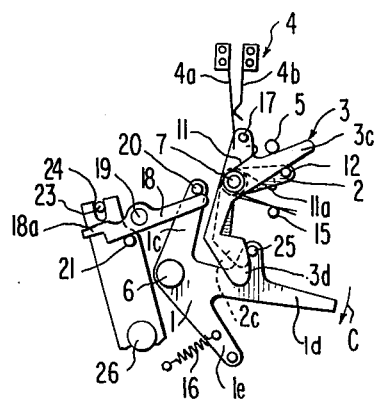
FIG. 3b is a similar view to that of FIG. 3a subsequent to shutter release.

Turning to FIGS. 3a and 3b, a third embodiment of the present invention is illustrated, in which case the operation is identical although the elements of this mechanism are somewhat different in form from the embodiments of FIGS. 1a–1b, and 2a–2b. A pin 7 pivotably mounts in common fashion, a C-shaped shutter release member 3 and a C-shaped latching member 2 while a pivot pin 6 acts as a pivot axis for a modified T-shaped shutter operating member 1 comprised of arms 1c, 1d and 1e. Power switch 4 is fixedly mounted such that contact 4a engages a pin 17 mounted on the C-shaped release member 3 which is spring biased counterclockwise by means of biasing spring 11, baiasinf spring 11a being wrapped about the same pivot pin 7 to spring bias the latching member 2 counterclockwise, such that the hooked end 2c engages pin 25 carried by shutter operating member arm 1d. In the third embodiment, additional elements are included comprising a motion transfer lever 18 pivotably mounted intermediate its ends by means of fixed pivot pin 19 and having one end in contact with a pin 20 fixedly carried by arm 1c. The biasing spring 16 tends to rotate the operating member 1 clockwise, tends therefore to drive the motion transfer lever 18 clockwise, which permits a platelike member 22 to rotate relative to its pivot axis 26 which motion results in pin 21 shifting within slot 24 of platelike member 22 and disengaging from notched end 18a of lever 18. The rotatable movement of member 22 is indicated by the double headed arrow E.

In operation of this embodiment, as seen in contrasting FIGS. 3a to FIG. 3b, the depression of the release button or interlocking member 5 in contact with the upper edge of the C-shaped shutter release member 3 causes initially pin 17 to move away from contact 4a, in the direction of arrow D, which then closes upon contact 4b of the power switch as in the previous embodiments. The initial clockwise movement of the release member 3 has no effect on the latching member 2. However, when the lower edge of the C-shaped release member opposite the release button 5 contacts the pin 12 carried by the latching member 2, the latching member 2 now moves clockwise against the bias of its spring 11a permitting pin 25 to ride out of the notched or hooked end 2c of the latching member, unlatching the shutter operating member 1 and permitting it to rotate clockwise, in the direction of arrow D, to the point where the pin 25 rides on the edge 3d of the irregular C-shaped release member 3 and prevents the counterclockwise pivoting of the release member 3 to the extent that the switch contacts 4a and 4b remain closed until termination of shutter operation and relatching of the shutter operating member 1.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A shutter release mechanism for a camera incorporating an electrically controlled shutter, and including a power switch having normally closed contacts for controlling the supply of electrical power to the electrical circuit controlling the operation of the shutter, said mechanism comprising:

a pivotable shutter operating member, first spring biasing means for biasing said shutter operating member towards shutter operating position, a latching member pivotably mounted adjacent said shutter operating member for movement between a latched position wherein an end portion thereof directly engages the shutter operating member to hold said shutter operating member in a non shutter operating position against the bias of said first spring biasing means and an unlatched position wherein said end portion allows said shutter operating member to rotate under said bias to said shutter operating position, a release member mounted in juxtaposition to said latching member and having a part thereof which operatively engages with said latching member for positively shifting said latching member to said unlatched position as said release member moves from latching member engaging position to a final position, second biasing means for biasing said latching member towards said latching position and said release member towards an initial position where said part thereof is out of engagement with said latching member, means mounting said power switch in operative position with respect to said release member, such that said release member, when biased to said initial position maintains the normally closed contacts of said switch open;

and depressible release button means operatively positioning adjacent said release member for contact therewith, said release button, said release member, said latching member and said switch contacts being positioned relative to one another such that said release button, when depressed, rotates said release member from said initial position to said latching member engaging position and then to said final position against the bias of said second biasing means, said release member moving away from said contacts to permit same to close prior to reaching said latching member engaging position, whereby said latching member remains unmoved during movement of said release member from a position permitting said contacts to close to said latching member engaging position, and means responsive to movement of said latching member to unlatched position to maintain said release member at said final position out of contact with said power switch to maintain the power switch contacts closed; said means for maintaining the power switch contacts closed comprising means carried by said shutter operating member directly engaging said release member to prevent rotation of said release member under the force of said second biasing means.

2. The release mechanism as claimed in claim 1, wherein said shutter operating member comprises a sector-shaped plate, said latching member and said release member comprise elongated members commonly mounted for pivotable movement on a pivot pin whose axis is parallel to the pivot axis of said shutter operating member, said second biasing means comprises common means which spring bias said latching member and said release member to positions where the end of said latching member engages a radial edge of said shutter operating member, the end of said release member opposite that facing the shutter operating member engages one contact of said power switch to maintain the power switch contacts open when the shutter operating member is in latched position, a fixed stop maintains the release member in power switch contact open position, and a pair of stops are carried by said release member to each side of said latching member for permitting limited pivotable movement of said release member with respect to said latching member to permit said switch contacts to close prior to said release member positively pivoting said latch member to non-latching position and wherein said means for maintaining said power switch contacts closed includes a peripheral edge of said shutter operating member which underlies the edge of the release member to prevent said release member from opening the switch contacts until the shutter operating member is relatched.

3. The release mechanism as claimed in claim 1, wherein said shutter operating member comprises an irregular rectangular plate pivotably mounted intermediate of its ends, said latching member comprises an elongated member pivotably mounted intermediate of its ends and having one end engagable with a side edge of the shutter operating member for maintaining the shutter operating member in latched position, said release member comprises a T-shaped member including a first arm positioned within the path of movement of a shutter release button, a second arm operatively contacting a fixed contact of said power switch and maintaining said switch in open position during shutter operating member latching, and wherein said second biasing means for biasing said latching member towards latching position and said release member towards switch open position comprises a pair of springs acting respectively on said latching member and said release member, a fixed stop operatively associated with said latching member maintains said latching member in a position against its spring bias to normally maintain said shutter operating member in latched position and one end thereof in engagement with the side edge of said shutter operating member, a pin is fixed to the opposite end of said latching member in the path of movement of said first arm of said release member such that movement of the release member to a position closing the normally closed switch contacts of said switch, causes said first arm to contact said pin fixed to said latching member and to cause, by further depression of said push button, unlatching of said shutter operating member, and wherein the radially outer edge of said shutter operating member moves into underlying position with respect to said one end of said release member to prevent said release member from returning under its spring bias until the shutter operating member is relatched with the switch contacts being maintained in closed position during the shutter movement.

4. The release mechanism as claimed in claim 1, wherein said shutter operating member is generally T-shaped in plan configuration, said latching member and said release member are irregularly C-shaped in plan configuration, and are commonly pivotably mounted for rotation about an axis intermediate of their ends, said release member includes a first arm operatively engaging one contact of said power switch to open the switch contacts when the shutter operating member is in latched position, and is contacted by a movable shutter release button to effect pivoting of said release member against said bias and in a direction tending to close said switch contacts, said shutter operating member includes a pin fixed thereto and operatively movable with respect to a second arm of said release member so as to move into edge abutment with said second arm to prevent rotation pivoting of said release member in a direction opposite to that effected by depression of said release push button upon release of said push button, and wherein said irregularly C-shaped latching member comprises one arm carrying a fixed pin mounted in the path of movement of a third arm of said release member for driving said latching member to a position releasing the pin carried by the shutter operating member subsequent to initial movement of said release member to close said switch contacts and wherein the other end of said C-shaped latching member terminates in a hooked portion which hooks said pin carried by said shutter operating member to prevent rotation of said shutter operating member against its bias spring to shutter operating position.

* * * * *